J. F. O'CONNOR.
AUTOMOBILE SHOCK ABSORBER.
APPLICATION FILED AUG. 17, 1914.
1,174,269.
Patented Mar. 7, 1916.
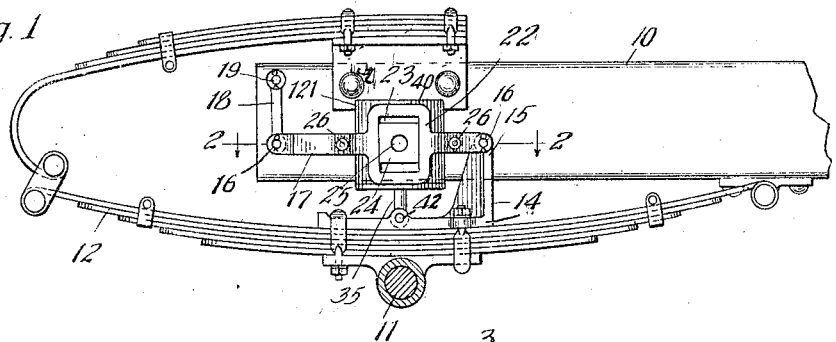
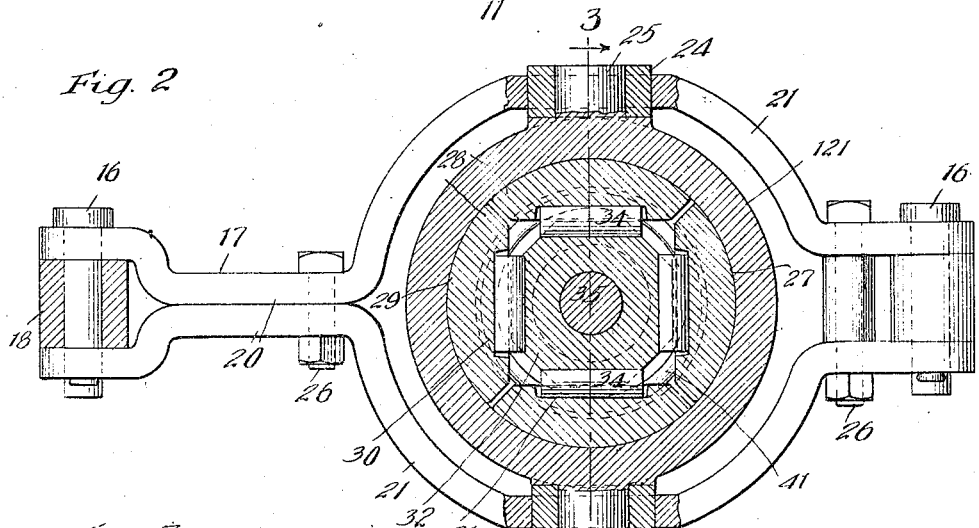
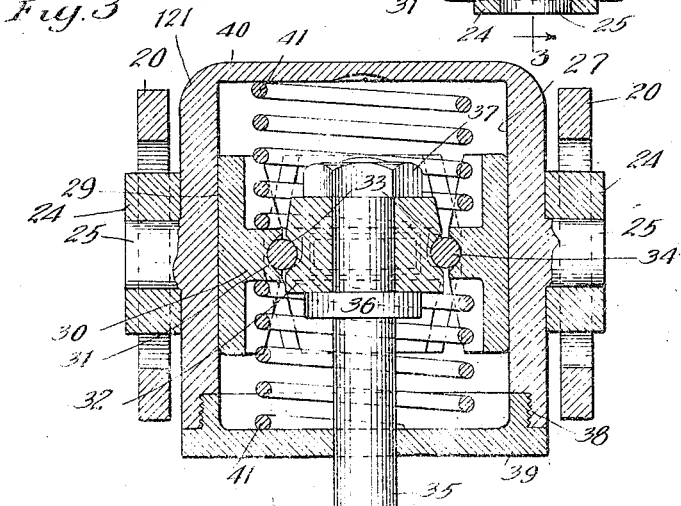
WITNESSES:
INVENTOR.
John F. O'Connor,
BY
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

AUTOMOBILE SHOCK-ABSORBER.

1,174,269.  Specification of Letters Patent.  Patented Mar. 7, 1916.

Application filed August 17, 1914. Serial No. 857,106.

*To all whom it may concern:*

Be it known that I, JOHN F. O'CONNOR, a citizen of the United States, residing at Chicago, in the county of Cook and State of Illinois, have invented a certain new and useful Improvement in Automobile Shock-Absorbers, of which the following is a full, clear, concise, and exact description, reference being had to the accompanying drawings, forming a part of this specification.

This invention relates to improvements in automobile shock absorbers.

An object of the invention is to provide a shock absorber of few parts, simple construction, and so arranged that a substantially uniform retarding action is provided in both directions of movement.

In the drawings forming a part of this specification, Figure 1 is a side elevation of a portion of an automobile chassis showing a spring in connection therewith and one form of my improved shock absorber; Fig. 2 is an enlarged horizontal sectional view taken substantially on line 2—2 of Fig. 1; and Fig. 3 is an enlarged vertical sectional view taken substantially on line 3—3 of Fig. 2.

In said drawing, 10 denotes a portion of the automobile chassis, 11 an axle, and 12 a three-quarter elliptical spring interposed between the member 10 and the axle, the parts being attached in any well known or suitable manner. Secured to the lower half member of the spring is a bracket 14 having an upward extension 15 to which is pivotally attached, as by a removable pin 16, a link 17, said link 17 being more particularly hereinafter described. At its outer end, the link 17 is pivotally connected to the lower end of a link 18, as by means of a detachable pin 16, the link 18 being similarly pivotally attached to the member 10, as indicated at 19. The link 17 comprises two similar members 20—20, each of which is provided with a substantially semi-circular bowed portion 21, the bowed portions being oppositely arranged and forming therebetween a loop within which is located the shell 121 of the shock absorber proper. Each member 20, in the bowed portion thereof, is provided with a rectangular enlargement 22, said enlargement having a rectangular recess 23 formed therein, the longer dimension of which extends vertically, and in which is adapted to reciprocate squared members 24 welded or otherwise suitably secured to lugs 25 formed on the shell integrally therewith on opposite sides thereof. The members 20—20 of the link 17 are detachably secured together, as by means of bolts and nuts 26—26. As clearly appears from Figs. 1 and 2, the rectangular enlargements 22—22 are so located in the link 17 that a movement of the end of said link where the same is connected to the link 18, of six inches will cause a movement of the enlargements of approximately forty per cent. thereof, or slightly less than 2½ inches.

The shock absorber proper comprises the cylindrical shell 121 having an interior cylindrical friction surface 27 on which slide and coöperate therewith, a plurality of friction shoes 28, there being four of said shoes, and each of the same has an outer arcuate friction surface 29; and an inwardly extending centrally disposed rib 30, the latter on its inner edge having a double-acting wedge surface 31. Coöperating with the friction shoes, is a double-acting wedge 32, which, as shown, is formed of a single piece, said wedge 32 having four double-acting wedge surfaces 33 located opposite the corresponding double-acting wedge surfaces on the friction shoes. Interposed between the double-acting wedge and the friction shoes, one for each shoe, are a plurality of anti-friction rollers 34,—see Fig. 3. The wedge 32 is rigidly attached to a bolt 35 and is held in position between a collar 36 and nut 37 threaded on said bolt. At its lower end, the shell 121 is interiorly threaded, as indicated at 38, and is adapted to have attached thereto a cap 39, the latter being centrally perforated to permit the passage therethrough of the bolt 35. Interposed between the upper wall 40 of the shell 121 and the ribs of the friction shoes, is a spring 41; a similar spring is interposed between said ribs and the cap 39. As clearly shown in Figs. 1 and 3, the bolt 35 is pivotally attached to the bracket 14, as indicated at 42.

In normal position of the parts, there is a space between the upper and lower surfaces of the squared members 24 and the opposite horizontal faces of the recess 23, which space, in actual practice, will approximate an inch, so that a certain amount of relative movement between the chassis and the axle may occur without bringing the shock absorber proper into operation. After this amount of movement, the shock absorber comes into play, due to the friction shell 121 being moved relatively to the bolt 35. During such operation, the double-acting wedge, by means of the anti-friction rollers interposed between it and the friction shoes, will force the friction shoes against the friction shell since the shoes are resisted in their movement by the springs 41. The resistance offered to this action remains substantially constant during the full stroke and in both directions, although, as will be understood by those skilled in the art, the amount of resistance can be made either more or less in either direction, by varying the angles of inclination of the proper double-acting wedge faces on the wedges and friction shoes. It will also be noticed that by varying the location of the rectangular enlargements 22—22 on the link 17, the ratio of movement between the shock absorber and the chassis and axle, may be changed as desired, and, furthermore, the amount of free movement or time during which the shock absorber remains inactive, may be varied by varying the clearance between the squared members 24 and the ends of the rectangular enlargements 22—22.

Although I have herein described in detail one embodiment of my improvements, I do not wish to be limited thereby, but What I do claim is:

1. A shock absorber of the character described comprising, in combination, a friction shell, a set of circularly arranged friction shoes within said shell and coöperable therewith, the said shoes having double-acting wedge faces, a spreader located between said shoes and having also coöperating double-acting wedge faces, rollers interposed between said wedge faces of the shoes and wedge, and springs resisting the movement of said shoes.

2. A shock absorber of the character described comprising, in combination, a friction shell having a removable cap at one end thereof, springs within said shell, a plurality of friction shoes slidable within said shell and having double-acting wedge faces, a wedge coöperable with said shoes and having also double-acting wedge faces, and a bolt slidable relatively to said shell to which said wedge is attached, said bolt extending through said removable cap.

3. A shock absorber of the character described comprising, in combination, a friction shell having a removable cap at one end thereof, a set of circularly arranged friction shoes slidably arranged within said shell and coöperable therewith, each of said shoes having double-acting wedge faces, springs opposing the movement of said shoes within said shell, a double-acting wedge coöperating with said shoes, rollers interposed between said wedge and the double-acting wedge faces of the shoes, and a bolt to which said wedge is rigidly attached, said bolt passing through the removable cap.

4. In a device of the character described, the combination with a spring secured to the chassis of an automobile and to an axle thereof, of a bracket secured to the spring, a link pivotally connected to the chassis, a second link pivotally connected to the first named link and to said bracket, and a shock absorber comprising parts secured to the spring and to the second named link and secured to the latter nearer its pivotal connection to the bracket than to its pivotal connection to the first named link.

JOHN F. O'CONNOR.

Witnesses:
CARRIE G. RANZ,
ELIZABETH M. BRITT.